(12) United States Patent
Slate

(10) Patent No.: US 10,190,298 B2
(45) Date of Patent: Jan. 29, 2019

(54) PRESSURE TESTING DEVICE AND RELATED METHODS

(71) Applicant: Edwin Slate, Falmouth, MA (US)

(72) Inventor: Edwin Slate, Falmouth, MA (US)

(73) Assignee: PRESS-CISION CO., Falmouth, MA (US)

( * ) Notice: Subject to any disclaimer, the term of this patent is extended or adjusted under 35 U.S.C. 154(b) by 107 days.

(21) Appl. No.: 15/614,804

(22) Filed: Jun. 6, 2017

(65) Prior Publication Data

US 2018/0094415 A1    Apr. 5, 2018

Related U.S. Application Data

(60) Provisional application No. 62/404,482, filed on Oct. 5, 2016.

(51) Int. Cl.
*E03C 1/00* (2006.01)
*G01M 3/28* (2006.01)
*E03C 1/302* (2006.01)

(52) U.S. Cl.
CPC .......... *E03C 1/302* (2013.01); *G01M 3/2807* (2013.01); *G01M 3/2815* (2013.01)

(58) Field of Classification Search
CPC . E03C 1/00; G01M 3/00; G01M 3/26; G01M 3/28; G01M 3/2807; G01M 3/2815
See application file for complete search history.

(56) References Cited

U.S. PATENT DOCUMENTS

| | | |
|---|---|---|
| 3,756,072 A | 9/1973 | MacMurray |
| 5,983,706 A | 11/1999 | Marks et al. |
| 6,070,453 A | 6/2000 | Myers |
| 6,378,356 B1 | 4/2002 | Ruiz et al. |
| 7,886,579 B2 | 2/2011 | Zinth et al. |
| 8,955,370 B1 | 2/2015 | Thornberg et al. |
| 9,261,426 B2 | 2/2016 | Penza et al. |
| 2003/0060721 A1 | 3/2003 | Nakazawa et al. |
| 2004/0118186 A1* | 6/2004 | Shultis ...................... F17D 5/02 73/49.2 |
| 2005/0011252 A1 | 1/2005 | Arima et al. |
| 2005/0109082 A1* | 5/2005 | Stewart ................... G01M 3/26 73/40 |

(Continued)

FOREIGN PATENT DOCUMENTS

WO    2014081058 A1    5/2014

OTHER PUBLICATIONS

Kuhlman Instrument co. Ultra K3, Traceability/Dependability, The Future in Electronic Pressure Testing, Norwalk, OH, 2 pages.

*Primary Examiner* — Nguyen Q. Ha
(74) *Attorney, Agent, or Firm* — Hoffman Warnick LLC

(57) ABSTRACT

Various aspects include a pressure testing device for testing a plumbing installation, along with related methods. In some cases, a device includes: a pressure testing line for coupling with the plumbing installation; a pressure sensor fluidly connected with the pressure testing line; a tamper-resistant memory; and a control system coupled with the pressure sensor and the tamper-resistant memory. In various embodiments, the control system is configured to control the pressure test of the plumbing installation based upon a threshold pressure for that particular test, and store a test record of the pressure test in a tamper-resistant memory upon completion of the pressure test.

20 Claims, 9 Drawing Sheets

(56) References Cited

U.S. PATENT DOCUMENTS

| | | |
|---|---|---|
| 2005/0247110 A1 | 11/2005 | Sagi et al. |
| 2005/0252278 A1* | 11/2005 | Bryant ................ G01M 3/2815 73/49.5 |
| 2007/0028675 A1* | 2/2007 | O'Sullivan ......... G01M 3/2815 73/49.1 |
| 2007/0181192 A1 | 8/2007 | Choi et al. |
| 2008/0092625 A1 | 4/2008 | Hinnrichs |
| 2009/0157003 A1 | 6/2009 | Jones et al. |
| 2010/0043534 A1 | 2/2010 | Sieijpen et al. |
| 2011/0046903 A1 | 2/2011 | Franklin |
| 2011/0178736 A1* | 7/2011 | Westra ..................... F17D 5/02 702/50 |

* cited by examiner

PRESSURE TESTING DEVICE AND RELATED METHODS

CROSS-REFERENCE TO RELATED APPLICATION

This application claims the benefit of U.S. Provisional Patent Application No. 62/404,482, filed on Oct. 5, 2016, which is hereby incorporated by reference in its entirety.

FIELD

The subject matter disclosed herein relates to pressure testing. More specifically, the subject matter disclosed herein relates to approaches for pressure testing plumbing installations.

BACKGROUND

Inspection and testing requirements for new and/or modified plumbing installations within commercial and/or residential structures are commonly dictated by regulations imposed by local, state and/or national authorities. Regulatory tests and inspections for new and/or modified plumbing installations are intended to provide verification of the plumbing integrity to ensure leak-free installations. Individuals authorized by the regulatory authorities generally conduct regulatory tests and inspections of new and/or modified plumbing installations. These authorized individuals typically include plumbers or other professionals licensed within the regulatory authority's operating jurisdiction.

For example, the regulatory tests for plumbing drain waste vents (DWV), pressurized plumbing supply lines and pressurized fuel gas lines (e.g., natural gas, propane) generally include the following operations: i) seal the plumbing installation such that it will hold pressure; ii) pressurize the plumbing installation to a minimum prescribed pressure; iii) monitor the pressure at the start of the test period (start pressure); iv) monitor the pressure at the completion of a prescribed test period (end pressure); and v) record the pressure drop within the plumbing installation that occurred over the prescribed test period (start pressure—end pressure). Pressure monitoring is typically conducted using analog and/or digital pressure gauges with minimum pressure readout resolution, as dictated by regulatory requirements. The authorized individual conducting the test typically files an inspection report after completion of the testing. The report generally includes a written statement by the author stating the details of the testing performed and results of the test.

BRIEF DESCRIPTION OF VARIOUS EMBODIMENTS

Various aspects include a pressure testing device for testing a plumbing installation, along with related methods. In some cases, a device includes: a pressure testing line for coupling with the plumbing installation; a pressure sensor fluidly connected with the pressure testing line; a tamper-resistant memory; and a control system coupled with the pressure sensor and the tamper-resistant memory. In various embodiments, the control system is configured to control the pressure test of the plumbing installation based upon a threshold pressure for that particular test, and store a test record of the pressure test in a tamper-resistant memory upon completion of the pressure test.

A first aspect of the disclosure includes: a device for pressure testing a plumbing installation, the device including: a pressure testing line for coupling with the plumbing installation; a pressure sensor fluidly connected with the pressure testing line; a tamper-resistant memory; and a control system coupled with the pressure sensor and the tamper-resistant memory, the control system configured to: obtain a command to initiate a pressure test of the plumbing installation; compare an initial pressure measured at the pressure sensor with a threshold pressure for a pressure test on the plumbing installation; prevent the pressure test of the plumbing installation in response to the initial pressure being less than the threshold pressure; initiate the pressure test of the plumbing installation over a prescribed period in response to the initial pressure meeting or exceeding the threshold pressure; and store a test record of the pressure test in the tamper-resistant memory upon completion of the pressure test.

A second aspect of the disclosure includes a method of pressure testing a plumbing installation, the method including: pressurizing the plumbing installation; and coupling a pressure testing device to the plumbing installation, the pressure testing device having: a pressure testing line for coupling with the plumbing installation; a pressure sensor fluidly connected with the pressure testing line; a tamper-resistant memory; and a control system coupled with the pressure sensor and the tamper-resistant memory, the control system configured to: obtain a command to initiate a pressure test of the plumbing installation; compare an initial pressure measured at the pressure sensor with a threshold pressure for a pressure test on the plumbing installation; prevent the pressure test of the plumbing installation in response to the initial pressure being less than the threshold pressure; initiate the pressure test of the plumbing installation over a prescribed period in response to the initial pressure meeting or exceeding the threshold pressure; and store a test record of the pressure test in the tamper-resistant memory upon completion of the pressure test; and provide the command to initiate the pressure test of the plumbing installation using the pressure testing device.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
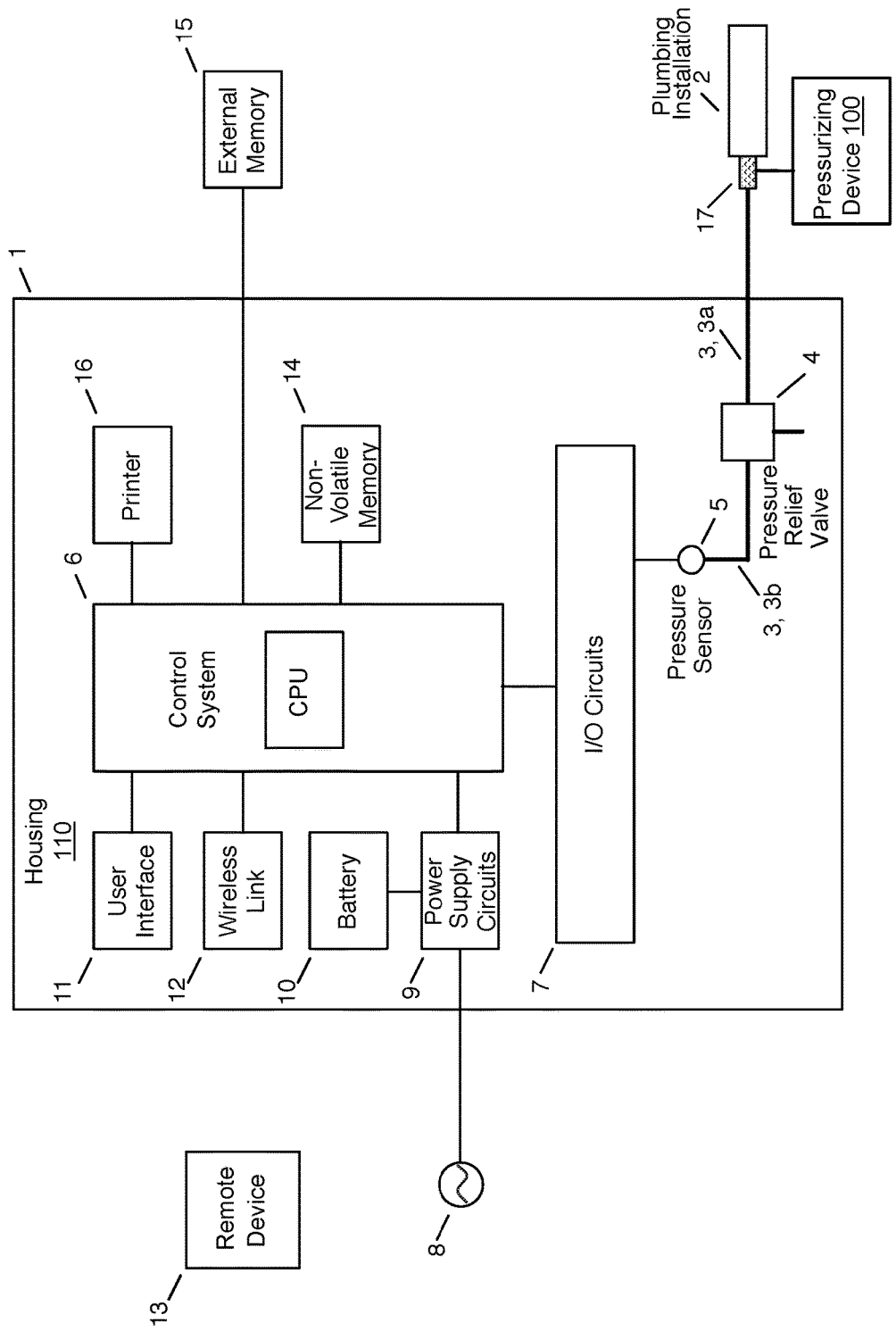
FIG. 1 is a schematic depiction of a device according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

The subject matter disclosed herein relates to pressure testing of plumbing installations. More specifically, the subject matter disclosed herein relates to devices and methods of pressure testing plumbing installations which control user error and accuracy.

As noted herein, conventional approaches for pressure testing plumbing installations involve significant user interaction in controlling the test. While various conventional approaches and related systems for pressure testing plumbing installations exist, the user (e.g. a plumber or other licensed pressure testing individual) of these systems is still tasked with determining whether a threshold pressure has been met in order to conduct the test. That is, these conventional systems still fail to control for user error when conducting pressure tests in plumbing installations. Inaccurate testing can have significant negative consequences. For example, inaccurate tests can allow unsafe conditions to persist or intensify, and can lead to dangerous conditions for building inhabitants and/or neighbors, as well as property damage. In some cases, leakage of combustible or otherwise noxious gases into living spaces or uncontrolled environments can injure people and/or property. Additionally, leakage of water or other fluids into uncontrolled environments can cause undesirable property damage. In many jurisdictions, property owners can be held liable for physical harm to inhabitants and/or neighbors caused by a leak, which can exponentially increase the downside to leakage testing that is prone to user error.

In contrast to conventional approaches, various aspects of the disclosure include a pressure testing device that regulates the pressure testing process and minimizes user error. In particular cases, various aspects of the disclosure include a device for the regulatory compliance testing of plumbing installations for verification of plumbing pressure integrity, particularly for, but not limited to: drain waste vents (DWV), pressurized plumbing supply lines and pressurized fuel gas lines. The device according to various embodiments can be configured to pneumatically or hydraulically connect to the plumbing installation under test, and automatically conduct the pressure testing according to regulatory requirements. In various particular embodiments, the device is configured (e.g., programmed) to automatically control and monitor the test process, record test pressure and test time, and generate a permanent, tamper-proof record of the test results following completion of the test. In some embodiments, the device can also be configured to automatically generate a statement (e.g., printed, digitally transmitted and/or stored) of test results suitable for inclusion in reports submitted to regulatory agencies.

In various aspects, the device includes a user interface allowing the operator to select the pressure test type (e.g., DWV, supply lines, fuel gas lines), and modify the default test parameters, e.g., of test pressure and duration. Minimum and maximum values for these test parameters will be imposed such that the operator can only modify the parameters to values within ranges specified by regulatory requirements. The user interface can also allow for entry of test meta-data including, but not limited to: location of test (e.g., street address, city, state, zip, as well as particular sector or sub-location within the site), and identification information of the operator (e.g., name of the operator conducting test). The user interface can provide an indication of one or more test parameters (e.g., test type, start pressure and test duration), measured pressure, total pressure drop from the start of test and/or remaining test time. In various embodiments, the range of valid starting pressures (as dictated by regulatory requirements for the selected test type) can be stored locally at the device and/or retrieved on-demand and/or on a periodic basis to provide an accurate guide for the initial pressurization of the plumbing installation.

The device according to various embodiments can include calibrated sensors for the measurement of test pressure within the plumbing installation. In order to maintain accuracy, these sensors can be calibrated on a prescribed periodic basis (e.g., bi-weekly, monthly, quarterly, yearly) by an accredited calibration facility that provides traceability to an internationally recognized standard organization (e.g., in the United States, the National Institute of Standards and Technology (NIST)). Using calibrated sensors for pressure measurements will allow for accuracy and repeatability of those measurements. In various embodiments, the device includes a pressure control mechanism, e.g., a pressure release valve, to protect the pressure sensor from pressure levels in the plumbing installation that could be damaging to that sensor.

In various embodiments, the device can include a control system configured to automatically conduct a pressure test on a specific plumbing installation. The pressure levels and test durations required by regulatory authorities can be imposed on the test such that the test cannot be initiated unless the initial test conditions (e.g., minimum test pressure and test duration) required by regulatory authorities are met. Once the operator initiates the pressure test (and the threshold pressure for that test is met), the control system can automatically measure and record pressure data at the start and end of the pressure test period (as a minimum), as well as determine the total pressure loss during the test period.

In various embodiments, the control system can be configured to record sampled pressure data at fixed intervals of time (e.g., every second, every few seconds, or at fraction-of-a-second intervals) for the duration of the pressure test. Following completion of the pressure test, the control system can develop a leakage model for the installation using the sampled pressure data. The actual (measured) leak rate, as well as a modeled leak rate for a specific test can then be displayed, recorded and/or reported with the pressure test data.

In various embodiments, the control system can automatically generate a permanent, tamper-proof record of test data from the device during the pressure testing process. One or more copies of the test data record can be stored in memory (e.g., in the device's non-volatile memory) and/or in a remote location (e.g., a cloud-based storage system or remote storage system) to create a lasting (e.g., permanent) record of each pressure test. The recorded data set for each pressure test can include all data necessary for complete verification of regulatory compliance, including, but not limited to: a) Date/time of test; b) Test type (DWV, supply lines, fuel gas lines, etc.); c) Starting gage pressure; d) Test duration; e) Ending gage pressure and total pressure drop; and f) Test meta-data, e.g., name of individual conducting the test and the location of the test (street/zone address, city and state).

In various embodiments, the device control system can be coupled with a printer, and can command printer to print a test report at the successful completion of each pressure test, where such reports can include all test information and results necessary for satisfaction of test/inspection documentation required by regulatory authorities.

In some cases, the device can include a history function which allows a user/operator to browse the full history of pressure tests conducted with the device, and to print, transmit and/or report selected historical test results. As used herein, the terms "user" and "operator" may be considered as substantial equivalents. The term "user" is intended to refer to a human user, such as a professional plumber or other professional licensed to test plumbing installations such as those described herein. The term "operator" can be considered to encompass users, as well as robotic or semi-robotic entities which may utilize the devices according to various embodiments. While many examples of use of the disclosed devices may involve a human user, it is understood that an operator may perform one or more of the functions to interact with the device according to various embodiments. In some cases, the device can be operated via a dedicated user interface coupled with the control system, and will incorporate internal (e.g., non-removable) non-volatile memory for the storage of data recorded during measurement and/or automatic pressurization cycles. Optionally, the device can be controlled via a "remote" device (e.g., desktop computer, laptop computer, tablet computer, and/or smart phone) connected to the device (e.g., with cable or wirelessly), and run application software designed to interface with the device (e.g., via the control system). The same remote device can also be used to record and/or transmit the data that is locally recorded at the device's non-volatile memory, and/or to upload the data log files stored on the device's internal non-volatile memory.

As noted herein, prior to the start of a pressure test, the plumbing installation is pressurized to a minimum pressure level dictated by regulatory requirements. Pressurization of the plumbing installation using a test fluid such as air or an inert gas as test media can be conducted using a conventional approach of establishing pressure, e.g., using a pressurizing device such as a hand pump or motorized compressor. Some regulatory requirements may allow specific plumbing installations (e.g., drain waste vents) to be pressurized by filling the plumbing under test with water. The device according to various aspects can support water or gas (e.g., air or other inert gas) media used for pressurizing the plumbing installation. The device can include a pressurization device for establishing the initial test pressure, e.g., the air compressor/pump used to establish the test pressure, however, in other cases this pressurization device may be a separate, conventional component.

In various particular embodiments, the device can be a portable apparatus having a weight and size such that a human operator can manually transport the device without the aid of a dolly, lift, etc. In various embodiments, the device can include a housing such as a suitcase-sized housing or large briefcase-sized housing for ease of transportation. In some cases, the device can be powered from an AC (or DC) power source or from a built-in battery source (rechargeable or non-rechargeable).

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

FIG. 1 shows a schematic depiction of an environment including a device 1 interacting with a plumbing installation 2 according to various embodiments. Plumbing installation 2 can be pressure tested (i.e., have its pressurized state monitored and recorded) according to various embodiments described herein. Plumbing installation 2 can represent a device with a closed (e.g., sealed) volume that is pressurized to a minimum pressure level dictated by regulatory requirements. Pressurization of the plumbing installation 2 can be conducted using any conventional pressurizing device 100, e.g., a hand pump or motorized compressor for establishing pressure in plumbing installation 2. Some regulatory requirements may allow specific plumbing installations (e.g., drain waste vents) to be pressurized by filling the plumbing under test with water. Device 1 can support water or gas (air or other inert gas) media for pressurizing plumbing installation 2. In some cases, pressurizing device 100 can be integral with device 1 (e.g., within a housing 110 of device 1), however, in other cases, pressurizing device 100 can include a separate physical component (e.g., an air compressor/pump) used to establish the test pressure.

In various embodiments, device 1 can include an adaptor 17 (e.g., adaptor fitting) to connect a pressure testing line 3 (also referred to as a plumbing, e.g., pneumatic plumbing line, shown in segments 3a and 3b) to plumbing installation 2. Adapter 17 can be sized as a standard fitting used on commercially available test fixtures in order to provide a sealed (fluidly sealed) connection between device 1 (specifically, line 3) and plumbing installation 2. In various embodiments, device 1 can include a pressure relief valve 4 coupled with to plumbing line 3. In various embodiments, pressure relief valve 4 includes a passive valve device that vents the pressure testing line 3 (segments 3a,3b) to atmosphere if pressure exceeds a fixed level. The vent pressure can be pre-selected to protect the sensor 5 from damaging over-pressurization. As shown in FIG. 1, pressure sensor 5 can be coupled (e.g., electrically) with control system 6 via one or more I/O circuits 7.

In various embodiments, control system 6 can include a central processing unit (CPU), as well as any conventional control architecture for performing processes as described herein, e.g., one or more modules, data stores, and/or control logic. In some cases, control system 6 can include a CPU including a programmable microprocessor. Device 1 can be powered by a power source 8, which can include a conventional utility AC power source, or a conventional DC power source, and/or an on-board primary (non-rechargeable) or secondary (rechargeable) battery source 10. The input power from the AC source 8 or battery source 10 can be conditioned by power supply circuits 9 to provide the voltage and current conditions required by device 1.

According to various embodiments, device 1 can also include a user interface 11 which may allow an operator (e.g., human user or robotic user) to monitor and operate device 1. User interface 11 can include any conventional user interface found in portable electronic systems, e.g., a conventional black-and-white or color touch screen, a passive color (or black-and-white) display with dedicated hardware-based buttons, or a hybrid touch-screen/hardware-based button interface. A wireless connection 12 can allow for use of one or more remote devices 13, e.g., in monitoring and/or control of device 1. Examples of remote device(s) 13 can include conventional smart phones, tablet computers, laptop computers and/or desktop computers equipped with suitable wireless connections and software applications designed for the monitoring and operation of device 1.

In various embodiments, control system 6 can interface with on-board non-volatile memory 14 for storage of recorded test data. In some cases, non-volatile memory 14 can take the form of a removable media device (SD card, micro SD card, USB memory stick, etc.), however it is understood that non-volatile memory is mounted in a location that is inaccessible to the operator (e.g., human user), thus rendering the card tamper-proof by the operator of device 1. It is understood that the housing holding non-volatile memory 14, along with other components of device 1, can include a tamper-evident mechanism such as a digital signature, seal or product package which indicates that tampering has occurred. In some cases, device 1 can also include external non-volatile memory 15 for the storage of recorded operating data. In the case that both internal non-volatile memory 14 and external memory device 15 are used, the test data will be recorded in both the tamper-proof internal non-volatile memory 14 as well as the external memory device 15.

In various embodiments, control system 6 can also interface with an on-board printer 16 that is configured to print a test report at the conclusion of one or more test sessions. The test report generated by printer 16 (via control system 6) is designed to provide necessary and sufficient test documentation suitable for inclusion in test/inspection reports required by regulatory authorities.

As described herein, pressure sensor 5 can be calibrated on a periodic basis (e.g., weekly, monthly, annually) in order to provide full and documented traceability to industry recognized calibration standards (e.g., NIST standards). In various embodiments, pressure sensor 5 can be calibrated with a pressure source or measurement that is traceable to a recognized calibration standard (e.g., NIST or other standard). In some particular cases, this calibration process can include providing (e.g., mailing or otherwise delivering) a portion of the device 1 to a test facility for calibration according to a recognized standard. In some cases, a portion of device 1 can be separated from the remainder of device 1 to ease the calibration process. In these cases, a portion of device 1 including one or more sensors (e.g., pressure sensor) and non-volatile memory 14 can be provided to a calibration facility for secure calibration and downloading of test data. In various particular embodiments, device 1 cannot perform (and/or record) a pressure test when device 1 is not properly calibrated or when the calibration is out of date. The calibration process can be designed to guarantee pressure measurement accuracy within specified levels. Periodic calibration of device 1 can provide a mathematical relationship between the electrical output of pressure sensor 5 (e.g., voltage) and the actual pressure as indicated by a traceable calibration standard. The resulting mathematical relationship is used to develop a pressure measurement scaling function that will be stored in the non-volatile memory 14 for use by control system 6. The scaling function can be used by control system 6 during processing of readings from pressure sensor 5 in order to ensure accuracy. A record of the pressure sensor calibration process can be recorded in the permanent program software (e.g., in CPU) of the control system 6 to allow recall and display on the user interface 11.

As noted herein, device 1 can be substantially contained within a portable housing 110. In some particular cases, housing 110 can have dimensions in any direction less than one (1) foot, and in some cases, can have at least one dimension equal to or less than approximately six (6) inches. In some particular examples, housing 110 can have dimensions between approximately 11"×9"×5". In many cases, housing 110 can have a weight less than approximately ten (10) pounds (lbs), and in some examples, can have a weight less than five (5) lbs. Housing 110 can be formed of a durable plastic, lightweight metal, or a composite.

Figure 2:
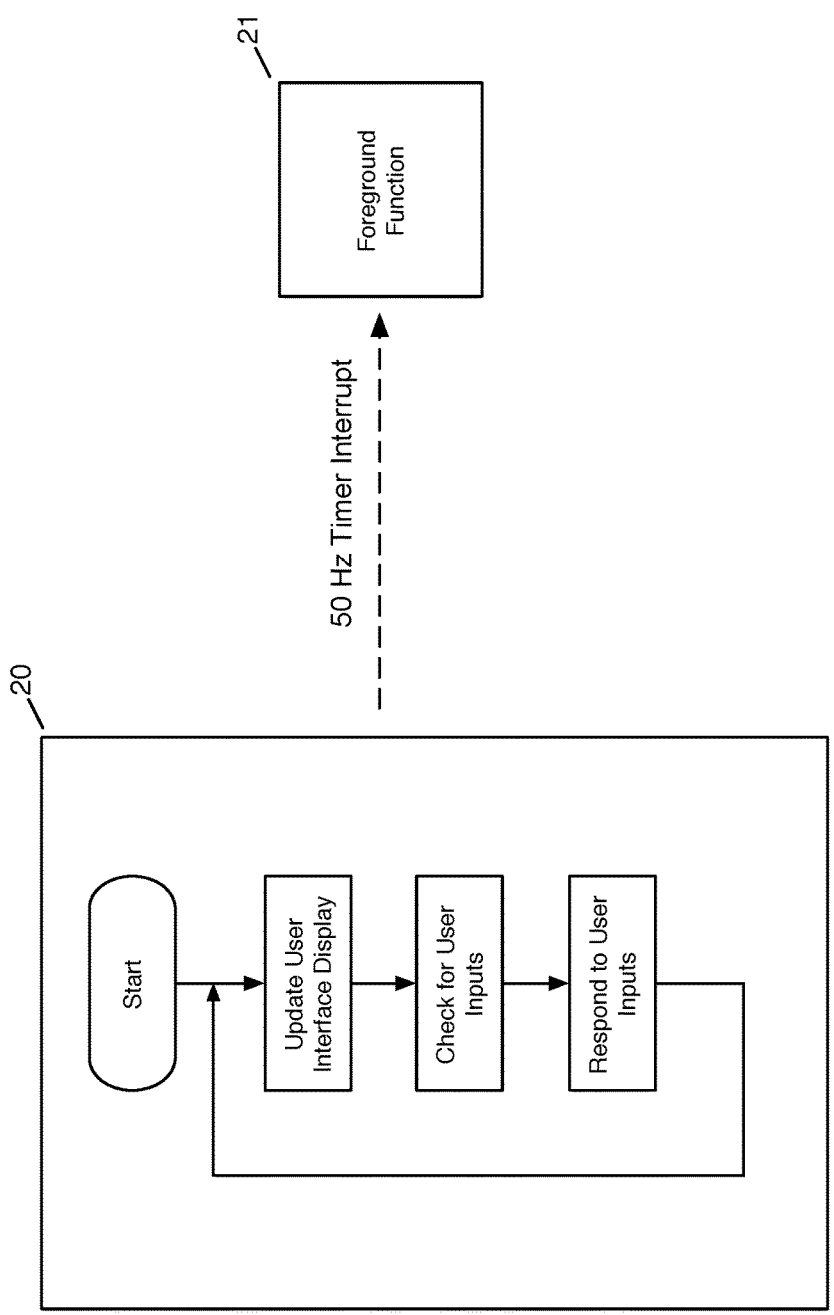
FIG. 2 is a flow diagram illustrating processes performed by the control system of the device of FIG. 1, according to various embodiments of the disclosure.

FIG. 2 shows a data flow diagram illustrating example programmed software operations within control system 6 (e.g., within CPU) from FIG. 1. In various embodiments, the software architecture can be divided into background functions 20 and one or more foreground functions 21. Background functions 20 can execute as a continuous loop, providing non-time-critical functions associated with the user interface 11 (FIG. 1) and other non-time critical operations (e.g., data management). The foreground function 21 can be executed at a fixed rate (a typical rate of 50 Hz shown) via a hardware-based timer-generated interrupt. The foreground function(s) 21 can contain time critical (real-time) software associated with the pressure measurement software elements and other real-time activities.

Figure 3:
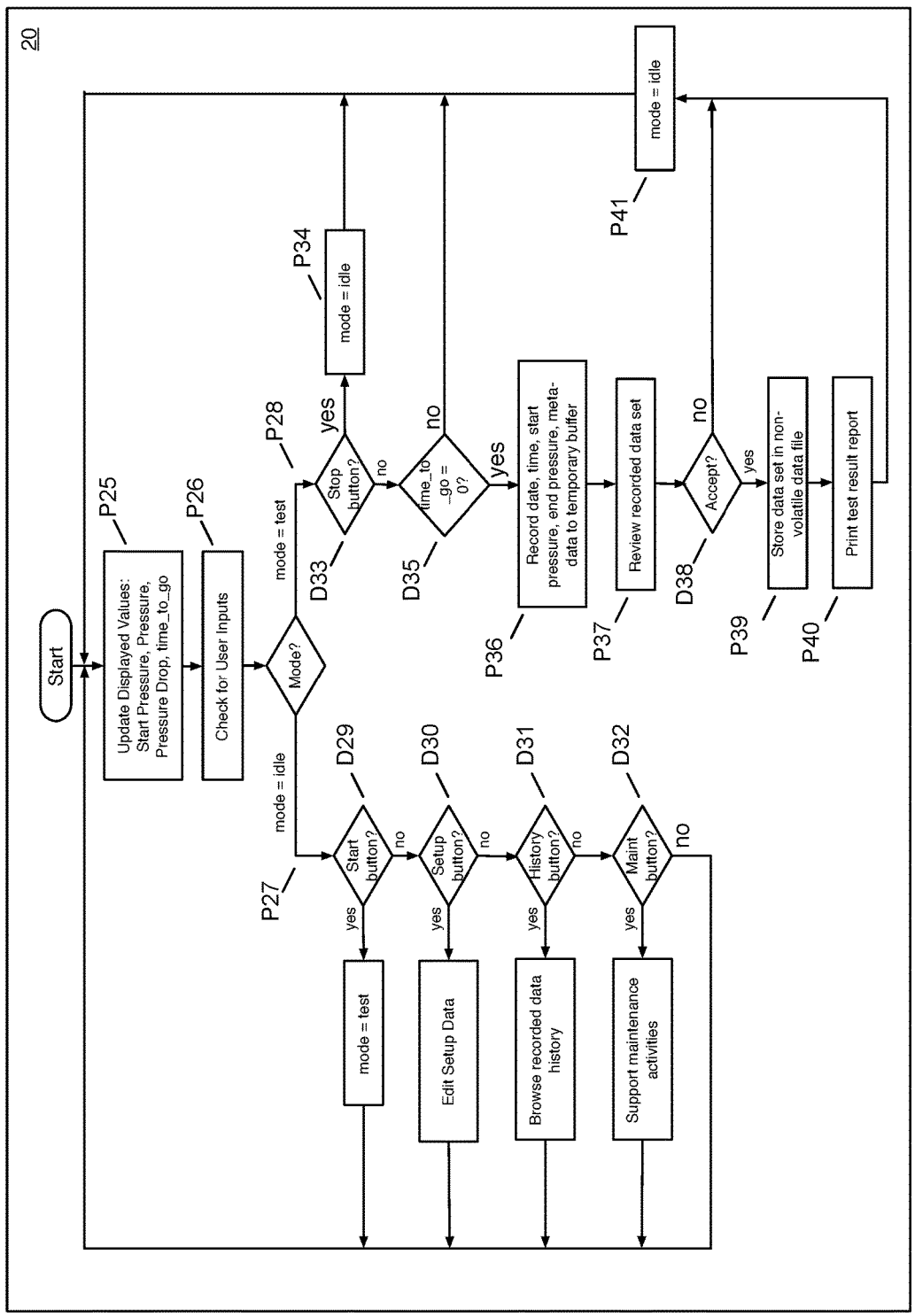
FIG. 3 is a flow diagram illustrating additional processes performed by the control system of the device of FIG. 1, according to various embodiments of the disclosure.

FIG. 3 shows a more detailed flow diagram illustrating example programmed software operations performed by control system 6. In particular, FIG. 3 shows a detailed flow diagram illustrating background functions 20 performed by control system 6. In various embodiments, the background functions 20 first update the displayed values on the user interface 11 (FIG. 1) using current values of start pressure, pressure, pressure drop and test time-to-go (Process P25). Next, control system 6 checks for user inputs from the user interface 11 (Process P26). Control system 6 can then branch to one of two paths (path, or mode P27; or path, or mode P28), depending on the operating mode of device 1, indicated by internal variable "mode" (or simply, operating mode). The first mode of operation is the idle mode P27, and the second mode of operation is the test mode P28. In idle mode P27, the device is not actively conducting a pressure test on the plumbing installation 2, whereas in test mode P28, the device is actively conducting a pressure test.

With particular attention to idle mode 27, control system 6 then executes various software operations based on user input received from user interface 11 (FIG. 1). Typical user input and associated software functions executed can include but are not limited to:

Start pushbutton pressed (Decision D29): Set mode=test (i.e., initiate start of pressure test);

Setup pushbutton pressed (Decision D30): Display test setup page(s) containing test parameters (test type, test pressure, duration) and test meta-data (location, personnel name) and controls for editing all setup data; and allow user/operator to modify and save test parameters and meta-data.

History pushbutton pressed (Decision D31): Display latest (newest) recorded data including: date, time, test type, start pressure, end pressure, test duration, test location, and user/operator identification (e.g., name); allow user/operator to browse the entire set of recorded data (historical data) via user interface 11; and allow user/operator to print any selected data record using on-board printer 16.

Maintenance pushbutton pressed (Decision D32): Display device serial number, sensor calibration dates and operating statistics; and allow operator to reset data log history and set current date/time.

With particular attention to test mode path P28, control system 6 can check whether operator requests test termination via pressing the Stop button (or equivalent) on user interface 11. If the Stop button (or command) is detected (at Decision D33), control system 6 sets the mode variable to idle (Process P34), then returns to the start of background function 20. If the stop button is not detected (at Decision D33), control system 6 then checks for completion of the test period by checking the time_to_go variable (Decision D35). The time_to_go variable is an internal countdown timer that is initialized to the test duration at the start of the pressure test. If the value of the timer (at Decision D35) is non-zero, the pressure test is still in progress and the control system 6 operation branches back to the start of the background function. If the value of the timer at Process P34 is zero, then the pressure test has completed. In this event, the full pressure test data set is recorded in a temporary data buffer (Process P36), then the full test results are displayed on user interface 11 (Process P37). The operator can review the recorded data and accept or reject the results via user interface 11 (Decision D38). If the data is not accepted by the operator, control system 6 can set the mode variable to idle (Process P41) and then returns to the start of the background function 20. If the operator accepts the data (Decision D38), the full test data record is recorded to a non-volatile data file (Process P39), e.g., at non-volatile memory 14 (FIG. 1), and the test report is compiled (and in some cases, printed) via the on-board printer 16 (Process P40). Control system 6 can then set operating mode to idle (Process P41).

Figure 4:
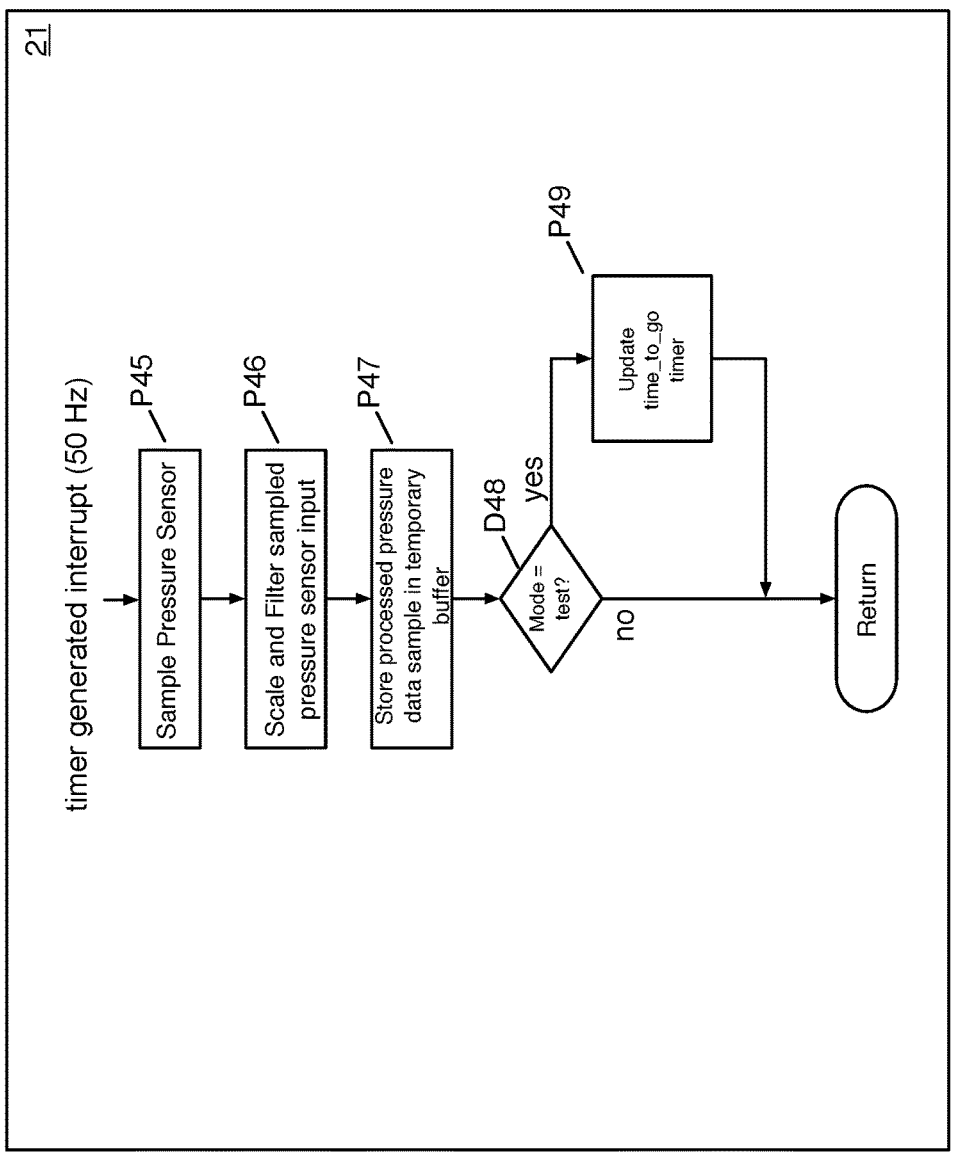
FIG. 4 is a flow diagram illustrating further processes performed by the control system of the device of FIG. 1, according to various embodiments of the disclosure.

FIG. 4 shows a detailed flow diagram illustrating example processes performed by control system 6 in foreground functions 21 (FIG. 1, FIG. 2). In this embodiment, the foreground function 21 is executed at a fixed rate (e.g., 50 Hz illustrated) in response to a hardware-based timer interrupt. As seen in FIG. 4, in Process P45, the foreground function 21 first samples the measurement at pressure sensor 5 (FIG. 1), then scales and filters the pressure measurement (Process P46). As noted herein, the scaling operation (Process P46) can include incorporating calibration functions for the associated pressure sensor 5 required to maintain specified pressure measurement accuracy. After scaling and filtering operations in Process P46, the processed pressure data will be stored in a temporary buffer (Process P47). Control system 6 checks if the mode variable is set to "test" (Decision D48), and if so, Process P49 is executed to update (decrement) the time_to_go variable used for monitoring the pressure test time remaining. Foreground functions 21 can execute as an interrupt-driven function at a fixed rate (e.g., 50 Hz), such that when completed, the process returns to background functions 20 at the interruption point. At the next interrupt, the foreground functions 21 will run from the Start.

Figure 5:
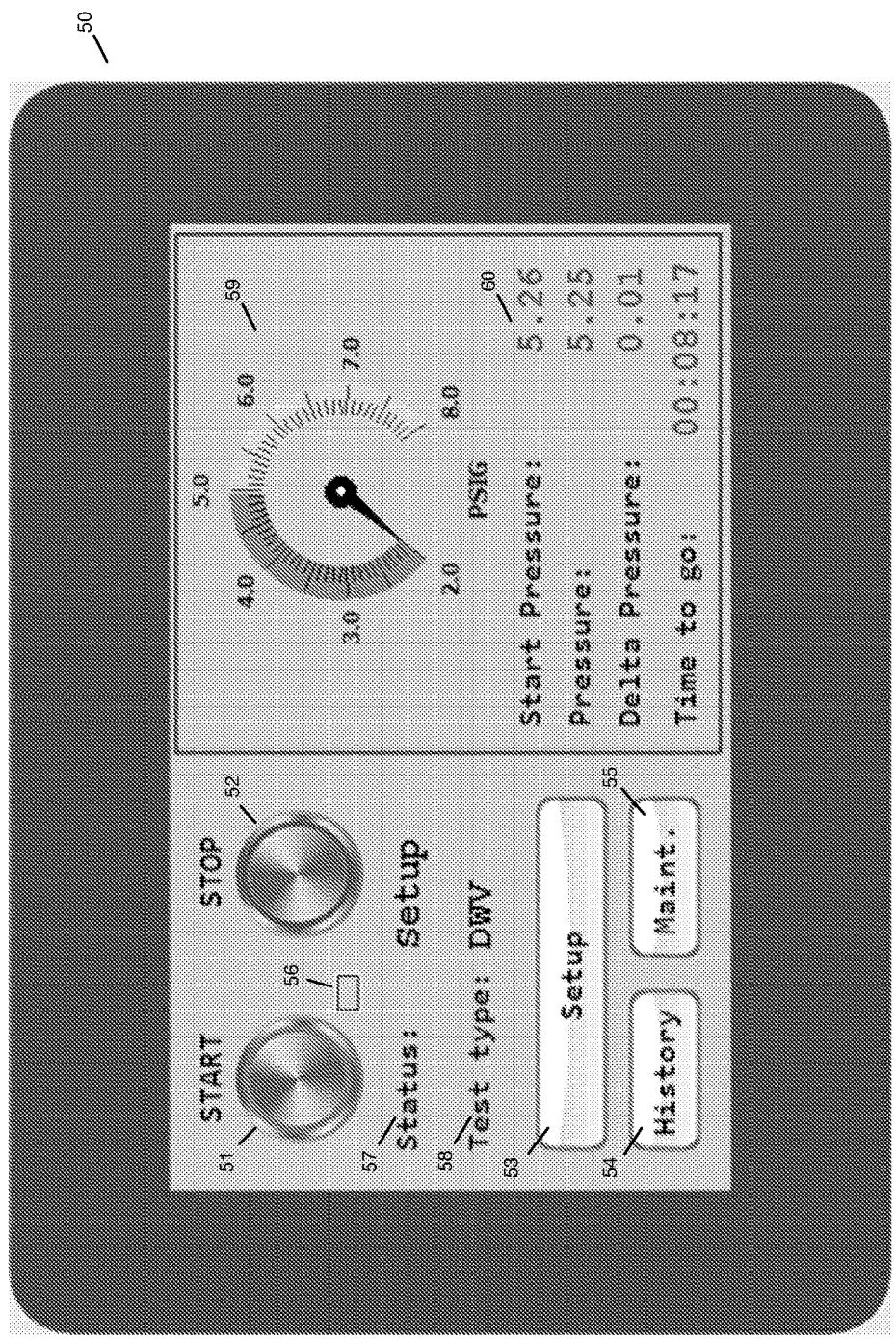
FIG. 5 is a schematic depiction of an example user interface display according to various embodiments of the disclosure.

In various embodiments user interface 11 (FIG. 1) is the primary mechanism for the user/operator to interact with device 1. FIG. 5 illustrates an example "main" display 50 for user interface 11 of device 1. The display screen illustrated incorporates touch-based pushbuttons for the operation of device 1, as described herein. However, it is understood that one or more of these buttons could be hardware-based buttons and/or hybrid touch/hardware buttons for performing functions described herein. In various embodiments, these buttons can include:

Start (51): Initiate the selected pressure test; Stop (52): Terminate the current pressure test in progress; Setup (53): Display test setup screens to allow user entry of test type, pressure, duration, location, and personnel name; History (54): Display historical pressure test data, i.e., recorded data sets; Maintenance (55): Support device maintenance activities, e.g., clear data history, set date/time, check sensor calibration dates, etc.

Additionally, main display 50 can include a number of indicators (e.g., of status and monitored data), examples of which are shown including: Test in progress (56): indicator (e.g., light-emitting diode, or LED indicator) to show the status of a test. In some cases, test in progress indicator 56 will be green when a test is in progress. Also shown is status (57): Text display indicating the status of the device. The status 57 (e.g., text display) can be generated by control system 6 and may take on one or more of the following strings: "Setup": displayed when test setup is required before initiation of a pressure test; "Ready": displayed when the test setup is complete and the initial pressure in the plumbing installation is at the prescribed level, i.e., ready for test initiation; and "Active": displayed when a test is in progress. Additional indicators can include: Test type (58): Text display indicating the type of test currently selected. The test type can be established during the test setup process prior to initiation of the pressure test. The test type string can be generated by control system 6 and may take on one or more of the following strings: "DWV": displayed when test type selected is for drain waste vents; "Supply": displayed when test type selected is for plumbing supply lines; and "Fuel gas": displayed when the test type selected is for fuel gas (natural gas, etc.). Additional indicators in main display 50 can include: Pressure gauge (59): e.g., an analog, digital or other meter (analog shown) indicating the current value of the pressure within plumbing installation 2 (FIG. 1). The example pressure meter shown incorporates a green color band to indicate valid (legal) initial pressure ranges for current test in progress, and red color bands to indicate invalid initial pressure ranges. The meter range and scale will be controlled by control system 6 based on the type of test selected during the test setup; Test data (60) numeric displays indicating the current values of test data, including, but not limited to: "Start pressure": displays the plumbing installation pressure at the start of the pressure test; "Pressure": displays the current value of plumbing installation pressure; "Delta pressure": displays the total pressure drop in the plumbing installation since the start of the test; "Time-to-go": displays the remaining time to completion of the test duration.

According to various particular embodiments, prior to initiation of a pressure test, the test parameters and metadata for the test must be entered by the user/operator. Attempts to initiate a pressure test via the Start button 51 (or other mechanism) prior to successful completion of test setup data entry will result in a displayed prompt indicating setup information must be entered prior to test initiation. In this way, control system 6 will prevent initiation of the pressure test until test setup is complete.

Figure 6:
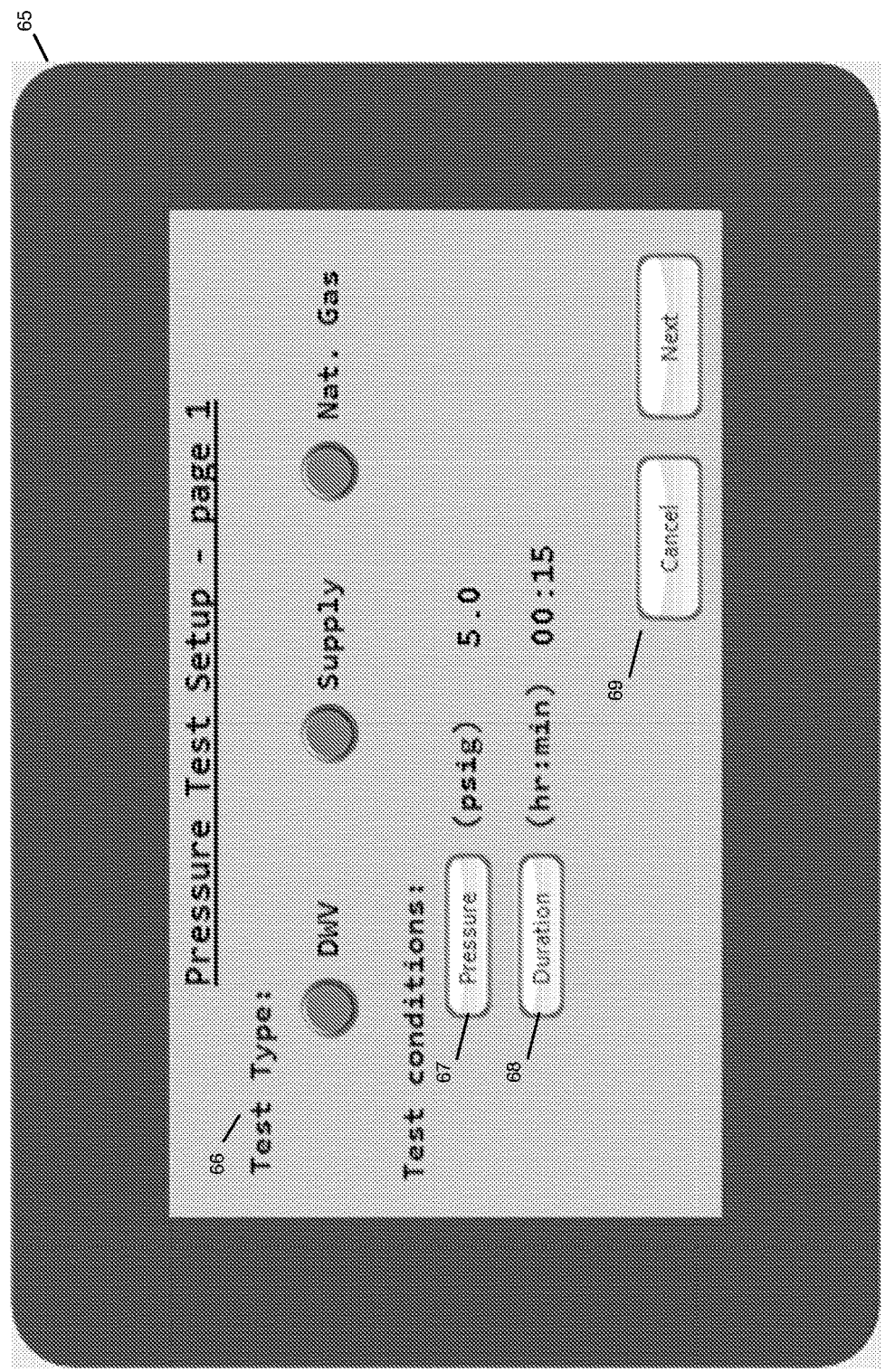
FIG. 6 is a schematic depiction of an additional example user interface display according to various embodiments of the disclosure.
Figure 7:
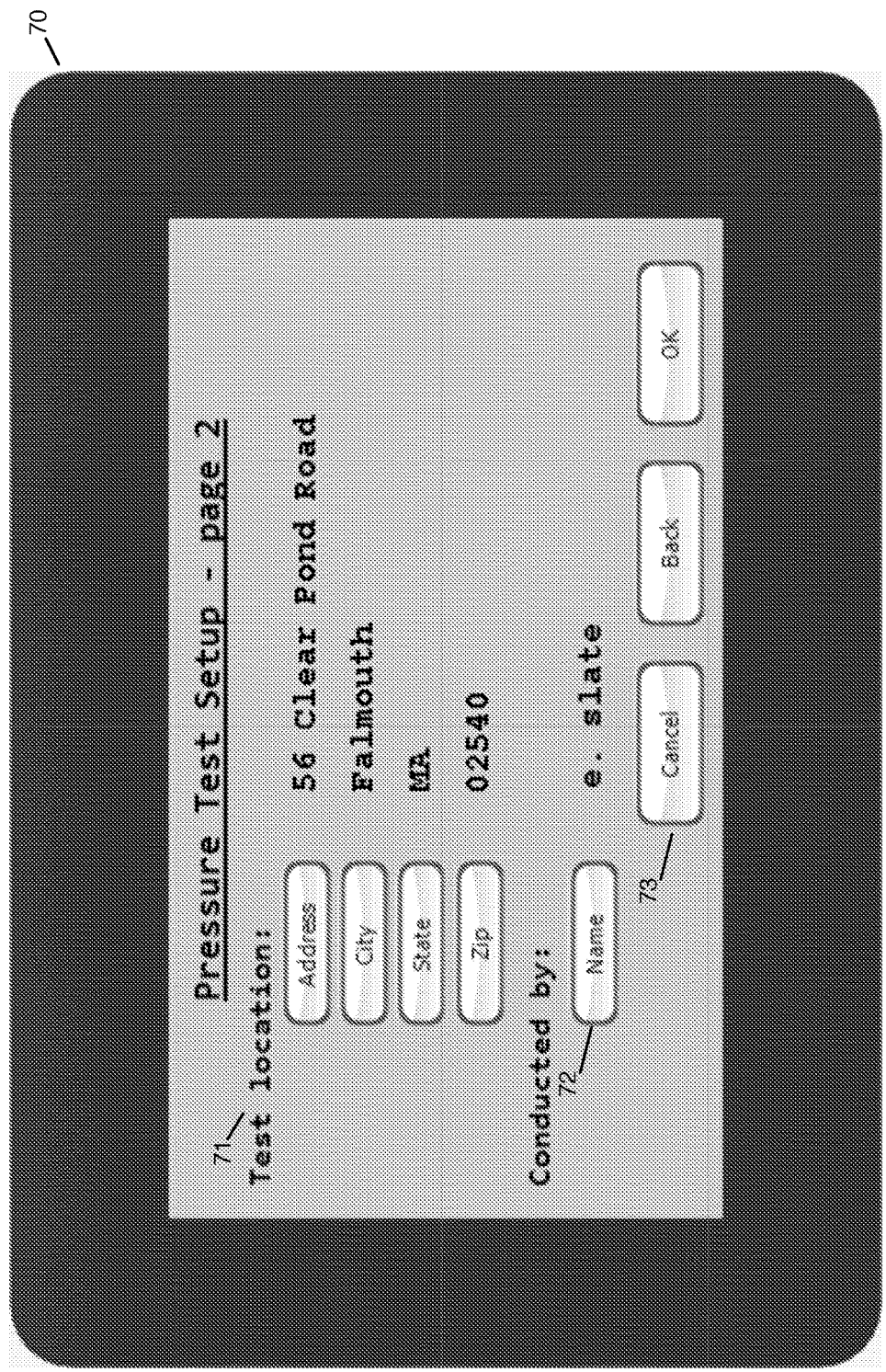
FIG. 7 is a schematic depiction of another example user interface display according to various embodiments of the disclosure.

Entry of setup information can be initiated by the user/operator from the main display 50, e.g., via the Setup button 53. Example setup displays 65, 70 are illustrated in FIGS. 6 (Setup page 1) and 7 (Setup page 2). In the example setup display 65 illustrated in FIG. 6, the user/operator enters the test operational parameters. As shown, test parameters entered by the operator include, but are not limited to: Test type (66), which can include a set of controls (e.g., radio buttons) that allow the user/operator to select one of a set of pressure test types supported; Test Pressure (67), which can include a set of controls (e.g., button(s) and static text display) that allows the user/operator to specify the desired test pressure. Control system 6 can impose minimum, and in some cases, maximum pressures dictated by regulatory authorities; Test duration (68), which can include a set of controls (e.g., button(s) and static text display) that allows the user/operator to specify the desired test duration. Control system 6 can impose minimum, and in some cases, maximum durations dictated by regulatory authorities. That is, in various embodiments, control system 6 can impose restrictions on both pressure and duration for a valid pressure test. In general, control system 6 can impose restrictions as a minimum test pressure and minimum test duration, according to corresponding regulations. In some cases, control system 6 can include a maximum test pressure and/or duration restriction as well. These pressures and durations can be test type specific (e.g., they will be different for fuel gas, DWV, supply line, etc. test types). In various embodiments, control system 6 will not allow the user/operator to specify a test pressure or duration that is outside the ranges of test pressure and test duration as programmed in control system 6 (e.g., as specified by the corresponding regulation). Additionally, the user/operator can navigate to the next setup display or cancel the current setup operation using the Next and Cancel operations (e.g., pushbuttons) 69 located on setup display 65. If the user/operator presses the Next button, setup display 70 (FIG. 7) is shown. As shown in FIG. 7, test meta-data entered by the user/operator can include (but is not limited to): Test location (71), which can include a set of controls (e.g., button(s) and static text displays) that allows the user/operator to specify the detailed location of the test (e.g., building zone, street address, city, state, zip code); and Personnel (72), which can include a set of controls (e.g., button(s) and static text display) that allows the user/operator to specify the identification information (e.g., name) of the user/operator conducting the test. In some cases, the user/operator can navigate to the previous setup display 65, cancel the current setup operation, or accept the entered setup data using the Back, Cancel, and OK pushbuttons 73 located on the setup display 70.

In various embodiments, once the setup information has been entered for a test on a specific plumbing installation 2, control system 6 (FIG. 1) will change the status indicator 57 in the main display 50 (FIG. 5) from "Setup" (indicating setup required) to "Ready" (indicating ready for test initiation). Once the status indicator 57 indicates "Ready", the test can be started only if the measured pressure in the plumbing installation 2 is greater than or equal to the minimum pressure for the test type selected (indicated by the green range of the pressure gauge 59 on the main display 50). If the pressure condition is satisfied, the user/operator can initiate the test by pressing the Start button 51 on main display 50. Unless terminated by the user/operator via the Stop button 52 on main display 50, the test will progress until the prescribed test duration has completed. Control system 6 can compile and store (and/or transmit to external memory 15) all data entered and measured during the course of the test. That is, according to various embodiments, control system 6 is configured to restrict testing unless the prescribed pressure for the particular test type has been satisfied (as measured by pressure sensor 5). In some particular cases, where the prescribed pressure or duration thresholds have not been met, control system 6 can provide a status (status indicator 57) of "Error" or other equivalent message to indicate that the test is not ready for initiation.

Figure 8:
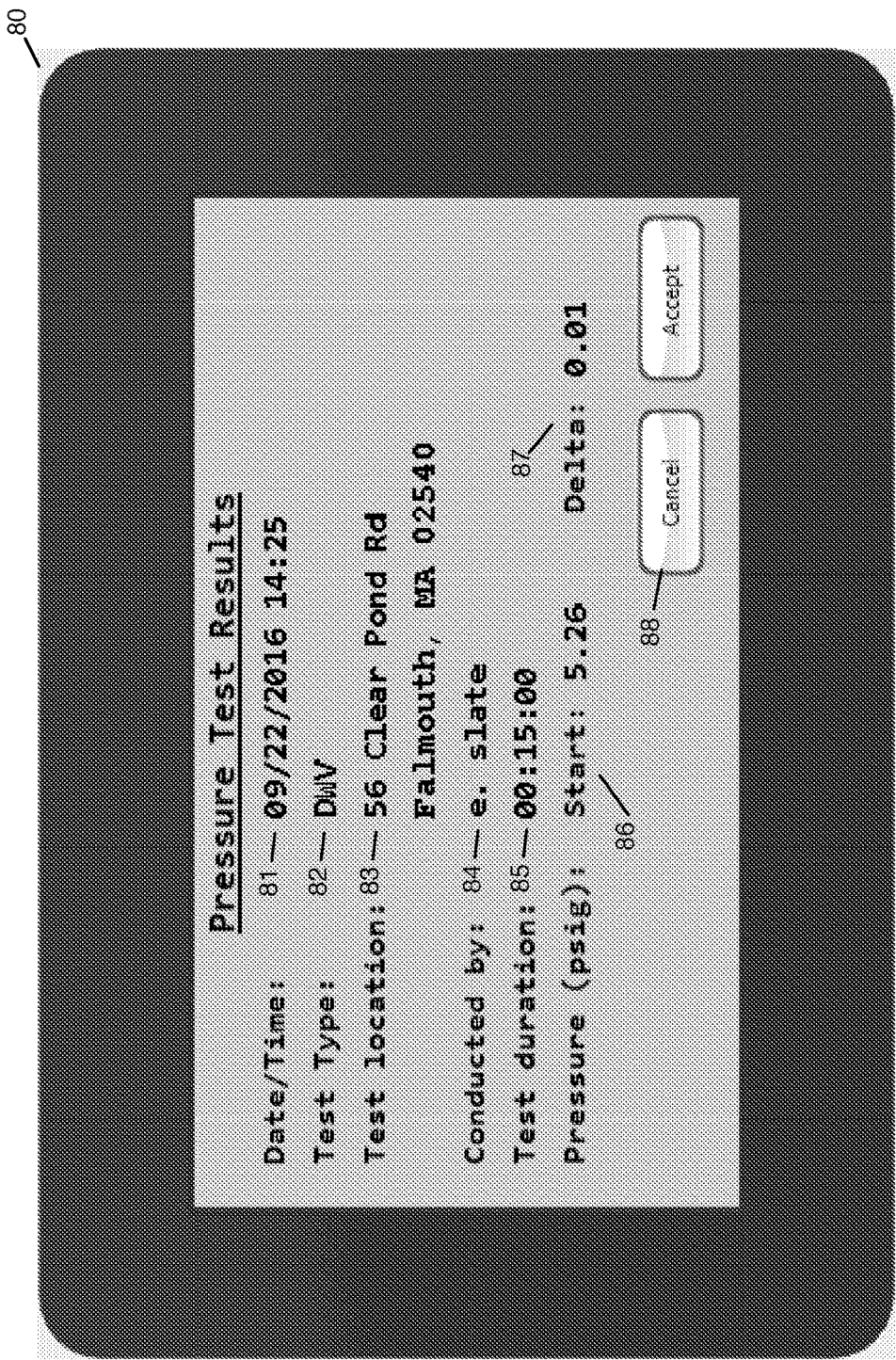
FIG. 8 is a schematic depiction of an additional example user interface display according to various embodiments of the disclosure.

In various embodiments, at the completion of the test duration, the test data is recorded to temporary buffers, and in some example embodiments, Pressure Test Results display 80 (FIG. 8) is shown on user interface 11. As shown in the example Pressure Test Results display 80 in FIG. 8, the control system 6 is configured to display at least one of: the recorded date and time (81) of the test, the test type (82), test duration (85), and test meta-data (e.g., location 83 and user/operator identifier 84, such as a name) In addition, the test results can be displayed in the form of start pressure 86 and pressure loss 87 (delta) (during the test period). Pressure Test Results display 80 may also include a leakage rate calculated from pressure data sampled during the course of the testing. In some cases, buttons 88 (e.g., push-buttons) on Pressure Test Results display 80 allow the user/operator to accept the data for permanent entry into a non-volatile data file (as well as transmission to another data store, e.g., external memory 15), or cancel the data record operation. If the operator presses the Accept pushbutton, the test data is recorded to a log file stored on non-volatile memory, and may additionally involve transmitting the data to a remote data store such as external memory 15. In this case, control system 6 opens the log file, writes the buffered copy of recorded test data (e.g., date, time, test type, test duration, start pressure, end pressure, delta pressure) and meta-data (e.g., test location, and user/operator identification) to the end of the log file, then closes the log file. In this case the user interface display is then reset to the main display page 50 (FIG. 5), and the pressure test results display function exits. If instead of pressing the Accept pushbutton, the user/operator presses the Cancel pushbutton on Pressure Test Results display 80, the data recording operation is cancelled. In this case, none of the data is recorded to the log file (or remote data store such as external memory 15), the local buffers storing the test data and meta-data are flushed, and the pressure test results display function exits.

Figure 9:
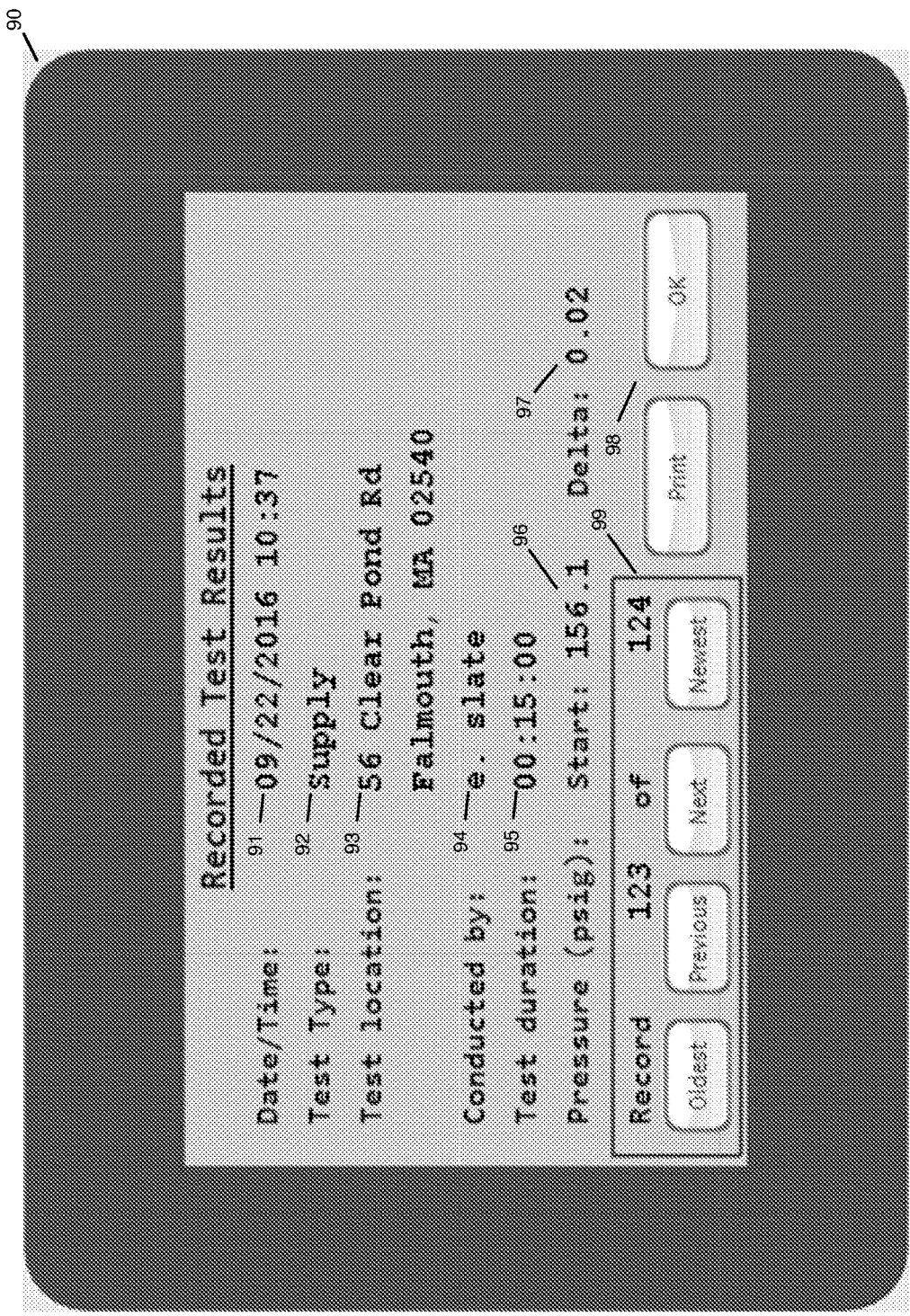
FIG. 9 is a schematic depiction of another example user interface display according to various embodiments of the disclosure.

Historical data can be reviewed on user interface 11 (FIG. 1) via the History button 54 on main display page 50 (FIG. 5). When the History button 54 is pressed, the user interface display page can be switched to a historical data operation-specific display page to allow the user/operator to review the complete history of recorded data. FIG. 9 illustrates an example Recorded Test Results display 90 that can be used for the historical review operation. The example Recorded Test Results display 90 illustrated in FIG. 9 can include the following data displays: Date/Time 91: Date and time of the selected pressure test; Test type 92: Test type for selected pressure test; Test location 93: Location meta-data for selected pressure test; Conducted by 94: Personnel (or other operator) identifier (e.g., name or identification number/letter(s)) meta-data for selected pressure test; Test duration 95: The test duration for the selected pressure test; Start pressure 96: The recorded start pressure for the selected pressure test; and Delta pressure 97: The recorded pressure loss for the selected pressure test. FIG. 9 also shows some additional example buttons in Recorded Test Results display 90, which can include button grouping 99, that allows the user/operator to browse the log file data records by selecting the first record (oldest), last record (newest), previous record and/or next record in the file. The current data record number being displayed can also be indicated, as well as the total number of data records in the log file. Additional example buttons in Recorded Test Results display 90 can further include button grouping 98, which allow the user/operator to generate a printed document detailing the selected pressure test (via the Print button), or to exit the recorded test results page (via the OK button) and return to the main display page 50 (FIG. 5).

In some cases, maintenance functions may be provided via one or more dedicated display pages initiated from the main display page 50 (FIG. 5) for one or more of: 1) Display of device serial number and/or sensor calibration dates; 2) Display of statistics: number of pressurization cycles initiated, data record cycles initiated, etc.; 3) Date/time adjustment: to allow the date and time for the device to be set in the event of time zone change, daylight savings event, etc.; 4) Data log history maintenance: allow the user/operator to clear the current history log buffer; and/or 5) Upload data log files: allow the user/operator to upload the log files stored on the non-volatile memory 14 to an external device, e.g., via a wireless or wired connection. This operation will preserve the log files existing on the non-volatile memory.

In various embodiments, clearing the history buffer preserves the existing data log files in non-volatile memory 14 of device 1. The clear history operation will result in creation of a new (empty) log file into which subsequent record data entries can be stored. While in various embodiments non-volatile memory 14 can be contained within device 1 (e.g., within housing 110), in some cases, non-volatile memory 14, or a copy of the data stored in that memory, can be located at a remote location. In some cases, non-volatile memory 14 can transmit a copy of the data stored thereon to an external data store such as external memory 15 or one or more distributed (e.g., cloud-based) data stores. In other cases, test data can be transferred using a portable memory device such as a universal serial bus (USB) memory device or a smart-device with internal memory.

According to various embodiments, device 1 can be configured to perform pressure testing on plumbing installation 2 with a variety of test media. That is, device 1 can be configured to perform pressure tests using air, inert gas (e.g., nitrogen) or water as test media. Some conventional pressure testing systems utilize a housing with an integrated pump/pressurizing mechanism. These conventional systems utilize this approach for safety when pressure testing using a combustible gas. The integrated pump/pressurizing mechanism can be controlled in a separate chamber within the housing of these conventional systems so as to minimize risks associated with testing using a combustible gas. In contrast, device 1 is configured to test primarily plumbing installations (e.g., plumbing installation 2), which are conventionally pressure tested using air, inert gas or water. For this reason, device 1 need not include an integral pump/pressurizing mechanism, and can be used in concert with a conventional air/gas or water pump/pressurizing mechanism located external to housing 110. As described herein, functions of control system 6 can be used to prevent unsafe or otherwise non-compliant testing of plumbing installation(s) 2 without the need for an integral pump/pressurizing mechanism.

As noted herein, various additional aspects of the disclosure can include a method of pressure testing a plumbing installation (e.g., plumbing installation 2, FIG. 1). Various processes in the method are described in additional detail throughout the disclosure, and as such, redundant explanation is omitted. The method can include:

A) coupling a pressure testing device (e.g., device 1, FIG. 1) to the plumbing installation 2;

B) pressurizing the plumbing installation (e.g., plumbing installation 2); and

C) providing a command to initiate the pressure test of the plumbing installation 2 using the pressure testing device 1.

In various embodiments, the pressure test is conducted for the entire prescribed period of testing for the particular test unless an interruption prompt (e.g., on the interface of pressure testing device 1) is accepted during the pressure test. As noted herein, pressure testing device 1 can provide a test record of the test which includes at least one of the following for the pressure test: a date, a time, a type, a starting gage pressure, a duration, an ending gage pressure, a total pressure drop or test meta-data. As is further noted herein, pressure testing device 1 can also store the test record of the pressure test in a non-volatile memory (e.g., non-volatile memory 14) coupled with the control system (e.g., control system 6) of the pressure testing device 1. As described herein, the pressure test performed on plumbing installation 2 can be one of a plurality of distinct pressure tests, and device 1 can be configured to perform the plurality of distinct pressure tests on plumbing installation 2. In some particular cases, the control system 6 of device 1 is further configured to record sampled pressure measurements from a pressure sensor (e.g., pressure sensor 5) at fixed intervals during the pressure test. In these cases, the control system 6 can be configured to send the recorded sampled pressure measurements to the tamper-resistant memory (e.g., non-volatile memory 14) during the pressure test. In particular cases, device 1 (e.g., control system 6) is configured to build a leakage model for the plumbing installation 2 with the recorded sampled pressure measurements from the pressure test, where the leakage model is configured to provide an expected leakage in the plumbing installation 2 over time. In some cases, the control system 6 is further configured to transmit a copy of the test record to an external memory (e.g., external memory 15, FIG. 1. As described herein, the control system 6 can be further configured to provide a user interface prompt for printing a copy of the test record (e.g., Print button, FIG. 9), and in response to acceptance of the user interface prompt, print the copy of the test record. In other particular embodiments the control system 6 is further configured to provide a user interface prompt for selecting a type of the pressure test from a plurality of types of pressure tests (e.g., DWV, Supply, Nat. Gas buttons, FIG. 6) prior to comparing the pressure measured at the pressure sensor with the threshold pressure for the pressure test.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to an individual in the art are included within the scope of the disclosure as defined by the accompanying claims.

This written description uses examples to disclose various aspects of the invention, including the best mode, and also to enable any person skilled in the art to practice the invention, including making and using any devices or systems and performing any incorporated methods. The patentable scope of the various aspects of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A device for pressure testing a plumbing installation, the device comprising:
   a pressure testing line for coupling with the plumbing installation;
   a pressure sensor fluidly connected with the pressure testing line;
   a tamper-resistant memory; and
   a control system coupled with the pressure sensor and the tamper-resistant memory, the control system configured to:
      obtain a command to initiate a pressure test of the plumbing installation;
      compare an initial pressure measured at the pressure sensor with a threshold pressure for a pressure test on the plumbing installation;
      prevent the pressure test of the plumbing installation in response to the initial pressure being less than the threshold pressure;
      initiate the pressure test of the plumbing installation over a prescribed period in response to the initial pressure meeting or exceeding the threshold pressure; and
      store a test record of the pressure test in the tamper-resistant memory upon completion of the pressure test.

2. The device of claim 1, wherein the control system is further configured to prevent the pressure test of the plumbing installation in response to detecting a calibration of the device is non-compliant.

3. The device of claim 1, further comprising an interface coupled with the control system.

4. The device of claim 3, wherein the control system is further configured provide a prompt on the interface for initiating the pressure test in response to the initial pressure meeting or exceeding the threshold pressure, and wherein the control system begins the pressure test only in response to acceptance of the prompt from the interface.

5. The device of claim 4, wherein the pressure test is conducted for the entire prescribed period unless an interruption prompt on the interface is accepted during the pressure test.

6. The device of claim 1, wherein the test record includes at least one of the following for the pressure test: a date, a time, a type, a starting gage pressure, a duration, an ending gage pressure, a total pressure drop or test meta-data.

7. The device of claim 1, further comprising a pressure relief valve coupled with the pressure testing line for regulating a flow of a testing fluid in the testing line.

8. The device of claim 1, wherein the tamper-resistant memory includes a non-volatile memory coupled with the control system.

9. The device of claim 1, the threshold pressure being a minimum pressure dictated by a regulatory standard for the pressure test, the pressure test being one of a plurality of distinct pressure tests, wherein the device is configured to perform the plurality of distinct pressure tests on the plumbing installation.

10. The device of claim 1, wherein the control system is further configured to record sampled pressure measurements from the pressure sensor at fixed intervals during the pressure test.

11. The device of claim 10, wherein the control system is configured to send the recorded sampled pressure measurements to the tamper-resistant memory during the pressure test.

12. The device of claim 10, wherein the control system is further configured to build a leakage model for the plumbing installation with the recorded sampled pressure measurements from the pressure test, the leakage model configured to provide an expected leakage in the plumbing installation over time.

13. The device of claim 1, wherein the test record is a permanent tamper-proof record of the pressure test.

14. The device of claim 1, wherein the control system is further configured to transmit a copy of the test record to an external memory.

15. The device of claim 1, further comprising a printer coupled with the control system, wherein the control system is configured to instruct the printer to print a copy of the test record in response to acceptance of a user interface prompt.

16. The device of claim 1, wherein the control system is further configured to provide a user interface prompt for selecting a type of the pressure test from a plurality of types of pressure tests prior to comparing the pressure measured at the pressure sensor with the threshold pressure for the pressure test, wherein the threshold pressure for the pressure test is based upon the type of the pressure test, and wherein the user interface prompt further permits a user to select the threshold pressure within a threshold pressure range dictated by a regulatory standard for the pressure test, wherein the threshold pressure range corresponds with a test duration for the pressure test.

17. The device of claim 1, further comprising a printer coupled with the control system, wherein the control system is further configured to instruct the printer to print a report of the test record in a format compatible with regulator authority reporting data.

18. The device of claim 1, further comprising a remote device coupled with the control system, the remote device configured to initiate the pressure test from a remote location.

19. A method of pressure testing a plumbing installation, the method comprising:
 pressurizing the plumbing installation;
 coupling a pressure testing device to the plumbing installation, the pressure testing device comprising:
  a pressure testing line for coupling with the plumbing installation;
  a pressure sensor fluidly connected with the pressure testing line;
  a tamper-resistant memory; and
  a control system coupled with the pressure sensor and the tamper-resistant memory, the control system configured to:
   obtain a command to initiate a pressure test of the plumbing installation;
   compare an initial pressure measured at the pressure sensor with a threshold pressure for a pressure test on the plumbing installation;
   prevent the pressure test of the plumbing installation in response to the initial pressure being less than the threshold pressure;
   initiate the pressure test of the plumbing installation over a prescribed period in response to the initial pressure meeting or exceeding the threshold pressure; and
   store a test record of the pressure test in the tamper-resistant memory upon completion of the pressure test; and
 providing the command to initiate the pressure test of the plumbing installation using the pressure testing device.

20. The method of claim 19, wherein the pressure testing device includes an interface coupled with the control system for providing the command to initiate the pressure test in response to the initial pressure meeting or exceeding the threshold pressure, and wherein the control system begins the pressure test only in response to acceptance of the prompt from the interface, and wherein the pressurizing is performed with water, air or an inert gas medium, and wherein the pressure testing device is configured to perform pressure testing with each of the water, air or inert gas medium.

* * * * *